1,451,572

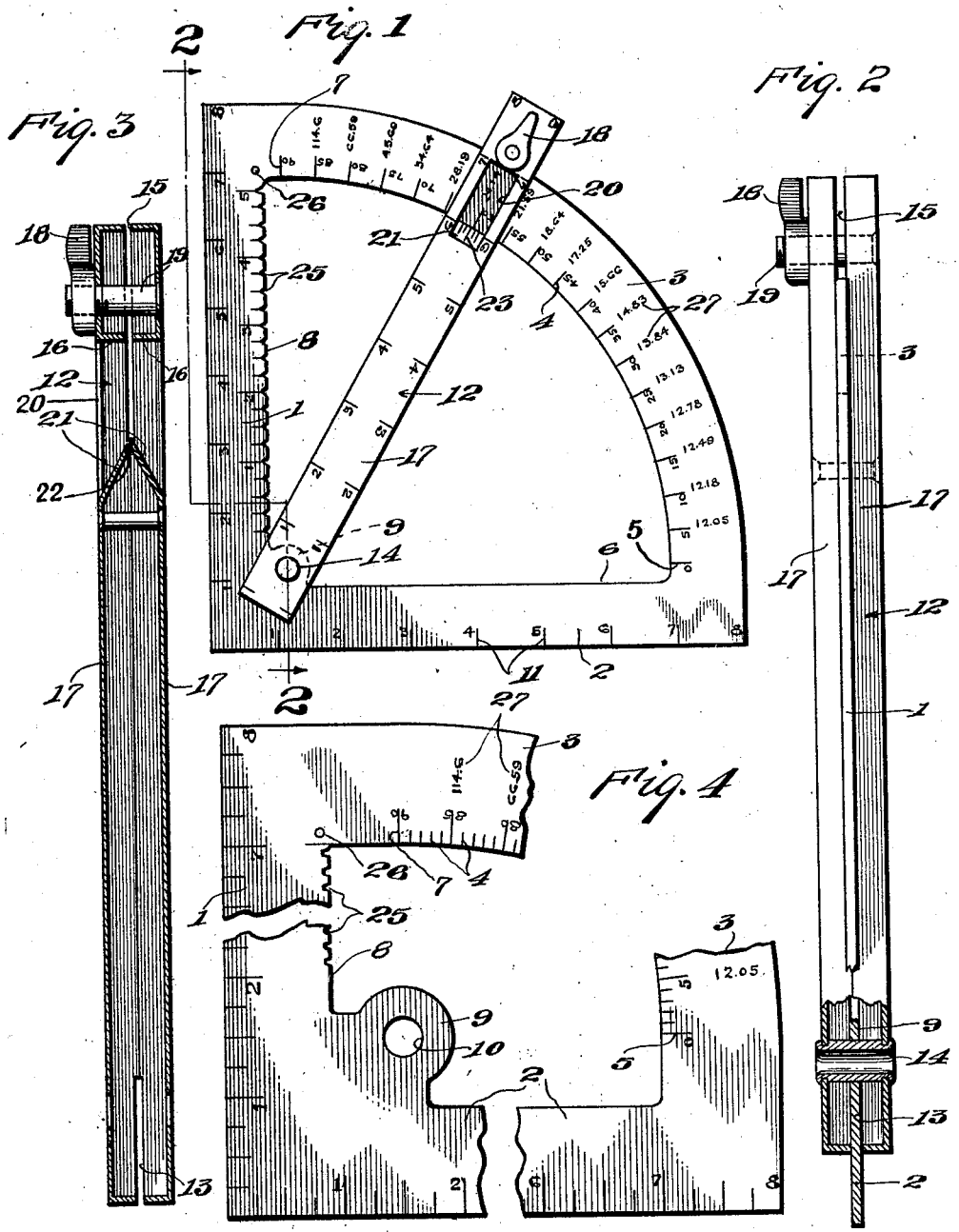
Apr. 10, 1923.
W. R. GREEN
MEASURING INSTRUMENT
Filed Mar. 18, 1921
1,451,572
W. R. GREEN
INVENTOR
BY Victor J. Evans
ATTORNEY Patented Apr. 10, 1923.

UNITED STATES PATENT OFFICE.

WILLIAM R. GREEN, OF DOWNERS GROVE, ILLINOIS.

MEASURING INSTRUMENT.

Application filed March 18, 1921. Serial No. 453,199.

*To all whom it may concern:*

Be it known that I, WILLIAM R. GREEN, a citizen of the United States, residing at Downers Grove, in the county of Du Page and State of Illinois, have invented new and useful Improvements in Measuring Instruments, of which the following is a specification.

This invention relates to measuring instruments and more particularly to the type of instrument used by carpenters, cabinet makers or analogous tradesmen.

An object of the invention is to provide a measuring instrument which may be employed in the capacity of a square, gauge, or compass and whereby the base and plumb angle cuts of a rafter may be computed and marked off in one setting of the instrument which setting will also indicate the length of the rafter.

Another object of this invention is to provide a measuring instrument as specified in which a pair of right angularly disposed arms are provided having their free ends connected with a segment or quadrant greater than a 90 degree quadrant and also one in which a movable arm or blade is provided for movement about an axis inwardly of the center junction of the connected ends of the right angularly disposed arms, thereby providing a tool which contains a 90 degree quadrant within one of larger dimensions whereby when said arm or blade is set or placed on any reading the device is automatically set for both the base and plumb angle cuts of a rafter.

Another object of this invention is to provide a measuring instrument wherein the movable arm is constructed of sheet metal pressed into shape and provided with a cutout portion having inclined reading surfaces at one end graduated for co-action with the graduations of the segment and which arm is provided to permit firm binding or clamping action thereof against its pivotal supporting base, in a right angle direction to prevent distortion of the blade.

A further object of this invention is to provide a plurality of spaced notches on the inner edge of one of said right angular arms which are adapted to permit use of the instrument or tool as a gauge, the said movable arm or blade co-operating with the notched arm for setting the instrument to facilitate ruling or gauging action thereof.

Other objects of the invention will appear in the following detailed description and in the accompanying drawing wherein:

Fig. 1 is a plan view of the improved instrument.

Fig. 2 is an edge elevation of the improved instrument.

Fig. 3 is a longitudinal section through the movable arm of the instrument.

Fig. 4 is an enlarged fragmentary elevation of the measuring instrument.

Referring more particularly to the drawing the instrument comprises right angularly disposed arms 1 and 2 which are connected and the outer ends of which are connected by a segment or quadrant 3. As clearly shown in Fig. 1 of the drawing the quadrant 3 is greater than one of 90 degrees, and it is graduated along its inner surface as at 4 throughout a 90 degree arch, the initial or zero graduation 5 being spaced inwardly from the inner edge 6 of the arm 2 a distance equal to the distance inwardly of the 90 degree graduation 7 from the inner notched edge 8 of the arm 1. A boss 9 is formed integrally with the arms 1 and 2 at their junction and projects inwardly therefrom into the space enclosed by the arms and quadrant. The boss 9 is provided with an opening 10, the center of which is in exact alignment with the graduations 5 and 7 thereby providing an accurate 90 degree quadrant with the center of the boss 9 as an axis within the larger quadrant formed by the arms 1 and 2 and segment 3. The arms 1 and 2 are graduated as indicated at 11 in any suitable linear measuring system.

A movable arm 12 is provided which is formed of sheet metal and pressed into shape to provide a substantially rectangular arm which is hollow and which is split at one end as shown at 13 to engage over the boss 9. A shoulder sleeve 14 is inserted through the split end of the arm 12 and crimped against the outer surfaces of the arm, the said sleeve connecting the sides of the arm and pivoting it to the boss 9. The end of the arm opposite the end which is provided with a split 13 is also split as at 15 for engaging over the segment 3 and as clearly shown in Fig. 3 of the drawing, the arm 12 is provided with inturned portions 16 extending at right angles to the sides 17 of the arm and adapted to have edge engagement with the quadrant 3, the said inturned portions 16 being drawn into binding engagement with the segment 3 to lock the arm 12 in adjusted positions by screwing of a thumb nut 18 upon the threaded stud 19 which extends through the outer end portion of the arm.

The sides 17 of the arm 12 are provided with cutout portions 20 which form the inturned portions 16 and with graduated reading tongues 21 which are inclined or bent inwardly as clearly shown in Fig. 3 of the drawing and which have their inner edges beveled as shown at 22 to fit against the outer surfaces of the segment 3. The reading tongues 21 are graduated as shown at 23, the said graduations being adapted to co-act with the graduations 4 to permit accurate setting or adjusting of the arm 12.

As shown in Figure 1 of the drawing the longitudinal center of the arm 12 aligns with the center graduation 23 and also with the graduations 5 and 7 and the center of the opening 10 when the arm 12 is moved so that one of its edges engages the inner edge 6 of the arm 2 or the other edge engages the inner edge of the arm 1. The formation of the hollow handle or arm 12, and the riveting of its two sides together will provide an arm of light weight construction and one which is relatively strong.

The inner edge 8 of the arm 1 is provided with a plurality of graduations 25 spaced at any desired digit of linear measurement and these notches are adapted to receive a pencil point or scriber to permit use of the instrument as a gauge. At such times the movable arm 12 is adjusted and set to ride along the edge of the board to be marked or gauged and with the scriber in the desired notch the instrument is moved along the board providing accurate gauging.

The instrument is provided with an opening 26 which may be used to insert a suitable pivoting pin or point therethrough and then by placing the scriber in any one of the notches 25 and moving the instrument about the point inserted through the opening 26, the instrument may be used as a compass.

As shown at 27 in Fig. 1 of the drawing the segment 3 is graduated to indicate the lengths of the rafters and the respective length indicating the graduations are positioned in alignment with the graduations 4 which are utilized in finding and marking the plumb and base angle cuts of rafters. In a finding the lengths and marking the plumb and base angle cuts of rafters, for example a 45% angle is to be cut on the base and plumb angle cuts of the rafters the blade 12 will then be moved upon its pivot until the graduation 23 aligns with the graduation 4 indicated by the number 45 which will show that the rafters will be 17.25 feet long and the respective ends of the rafters will be properly marked.

It is, of course, to be understood that the invention may be constructed in various other manners and the parts associated in different relations and, therefore, I do not desire to be limited in any manner except as set forth in the claims hereunto appended.

Having thus described my invention what I claim is:

1. An instrument of the class described comprising angularly disposed arms, a segment of more than 90 degrees connecting the spaced ends of said arms, a pivoting boss offset inwardly from the junction of said arms and provided with an opening, concentric with said segment and the center of which forms the apices of the angles denoted on said segment, an arm pivoted to said boss for co-action with said segment, said arm being formed of sheet metal bent to provide a hollow arm structure and provided with cutout portions in its sides forming inturned right angularly disposed clamping ears, and means for clamping said ears in gripping engagement against said segment to lock the arm in adjusted positions.

2. An instrument of the class described comprising angularly disposed arms, a segment of more than 90 degrees connecting the spaced ends of said arms, a pivoting boss offset inwardly from the junction of said arms and provided with an opening concentric with said segment and the center of which forms the apices of the angles denoted on said segment, an arm pivoted to said boss for co-action with said segment, said arm being formed of sheet metal bent to provide a hollow arm structure and provided with cutout portions in its sides forming inturned right angularly disposed clamping ears, and means for clamping said ear in gripping engagement against said segment to lock the arm in adjusted positions, inwardly inclining reading tongues formed on said arm and being graduated, the center graduation aligning with the pivotal axis of said arm.

3. In an instrment of the class described, right angularly disposed arms, a segment of more than 90 degrees connecting the spaced ends of said arms, a pivotal boss offset inwardly from the junction of said arms, a movable arm pivotally connected to said boss and having its pivotal axis and longitudinal center adapted to align with the terminals of a 90 degree graduated arch on said segment, the edges of said movable arm adapted to abut the edges of said angularly disposed arms to limit the pivotal movement of the movable arm, said movable arm provided with inturned portions, and clamping means for clamping the inner edges of said inturned portions in locking engagement with said segment to lock said arm in adjusted positions.

4. In an instrument of the class described, right angularly disposed arms, a segment of more than 90 degrees connecting the spaced ends of said arms, a pivotal boss offset inwardly from the junction of said arms, a movable arm pivotally connected to said boss and having its pivotal axis and longitudinal center adapted to align with the terminals of a 90 degree graduated arch on said segment, the edges of said movable arm adapted to abut the edges of said angularly disclosed arms to limit the pivotal movement of the movable arm, said movable arm provided with inturned portions, clamping means for clamping the inner edges of said inturned portions in locking engagement with said segment to lock said arm in adjusted positions, one of said right angularly disposed arms provided with spaced gauging notches in its inner edge.

In testimony whereof I affix my signature.

WILLIAM R. GREEN.